(12) United States Patent
Lu

(10) Patent No.: US 12,523,946 B2
(45) Date of Patent: Jan. 13, 2026

(54) IMAGING DEVICE AND IMAGING METHOD THEREOF, AND PRINTER

(71) Applicant: FAITH BILLION TECHNOLOGY DEVELOPMENT LIMITED, Wanchai (CN)

(72) Inventor: Zengxiang Lu, Beijing (CN)

(73) Assignee: FAITH BILLION TECHNOLOGY DEVELOPMENT LIMITED, Wanchai (CN)

( * ) Notice: Subject to any disclaimer, the term of this patent is extended or adjusted under 35 U.S.C. 154(b) by 0 days.

(21) Appl. No.: 18/688,986

(22) PCT Filed: May 17, 2023

(86) PCT No.: PCT/CN2023/094719
§ 371 (c)(1),
(2) Date: Mar. 4, 2024

(87) PCT Pub. No.: WO2023/246383
PCT Pub. Date: Dec. 28, 2023

(65) Prior Publication Data
US 2025/0147447 A1    May 8, 2025

(30) Foreign Application Priority Data
Jun. 24, 2022   (CN) .......................... 202210729934.3

(51) Int. Cl.
*B41J 2/447* (2006.01)
*B41J 2/45* (2006.01)
(Continued)

(52) U.S. Cl.
CPC ........ *G03G 15/04036* (2013.01); *B41J 2/447* (2013.01); *B41J 2/451* (2013.01);
(Continued)

(58) Field of Classification Search
CPC ..... B41J 2/451; B41J 2/447; G03G 15/04036; G03G 15/011; G03G 15/04054;
(Continued)

(56) References Cited

U.S. PATENT DOCUMENTS

| 5,841,952 A | 11/1998 | Shaklee |
| 6,853,397 B2 | 2/2005 | Onishi et al. |

(Continued)

FOREIGN PATENT DOCUMENTS

| CN | 1484112 A | 3/2004 |
| CN | 1495561 A | 5/2004 |

(Continued)

OTHER PUBLICATIONS

Search Report from corresponding Chinese Application No. 2022107299343 dated Oct. 14, 2024 with English translation.

(Continued)

*Primary Examiner* — Yaovi M Ameh
(74) *Attorney, Agent, or Firm* — Ruggiero McAllister & McMahon LLC; Edward L McMahon

(57) ABSTRACT

An imaging device includes: M rotatable photosensitive drums, at least one display chip, at least one projection lens, and at least one beam deflection system. The light-receiving region of each photosensitive drum includes multiple light-receiving sub-regions. Each display chip includes at least two light-emitting regions arranged in a first direction. At least one projection lens is in one-to-one correspondence with the at least one display chip. Each projection lens is configured to form an image for a corresponding display chip. The at least one beam deflection system is in one-to-one correspondence with the at least one display chip. The beam deflection system is configured to deflect an image, which is formed by light from each light-emitting region in (Continued)

the display chip through a corresponding projection lens, to a corresponding light-receiving sub-region.

20 Claims, 11 Drawing Sheets

(51) Int. Cl.
| | |
|---|---|
| *G02B 27/14* | (2006.01) |
| *G03G 15/01* | (2006.01) |
| *G03G 15/04* | (2006.01) |
| *G03G 15/043* | (2006.01) |
| *G03G 15/32* | (2006.01) |
| *H04N 1/028* | (2006.01) |
| *H04N 1/00* | (2006.01) |

(52) U.S. Cl.
CPC .......... *G02B 27/14* (2013.01); *G03G 15/011* (2013.01); *G03G 15/04054* (2013.01); *G03G 15/0409* (2013.01); *G03G 15/0435* (2013.01); *G03G 15/326* (2013.01); *H04N 1/02845* (2013.01); *H04N 1/00037* (2013.01)

(58) Field of Classification Search
CPC .......... G03G 15/0409; G03G 15/0435; G03G 15/326; G02B 27/14; H04N 1/02845; H04N 1/00037
See application file for complete search history.

(56) References Cited

U.S. PATENT DOCUMENTS

| | | | |
|---|---|---|---|
| 2003/0071125 A1 | 4/2003 | Yoo | |
| 2004/0183890 A1* | 9/2004 | Sakamoto | ............... B41J 2/473 347/233 |
| 2009/0041503 A1* | 2/2009 | Yamaguchi | .......... H04N 1/1933 399/220 |

FOREIGN PATENT DOCUMENTS

| | | | | |
|---|---|---|---|---|
| JP | H0776133 | | 3/1995 | |
| JP | 2001010104 | | 1/2001 | |
| JP | 2001042554 A | | 2/2001 | |
| JP | 2001051483 | | 2/2001 | |
| JP | 2001277590 A | * | 10/2001 | ............... B41J 2/44 |
| JP | 2007296765 A | | 11/2007 | |
| JP | 2008175859 A | | 7/2008 | |
| JP | 2008282021 | | 11/2008 | |
| JP | 2009058911 | | 3/2009 | |
| JP | 2011173303 A | * | 9/2011 | ............... B41J 2/44 |
| JP | 2022017642 | | 1/2022 | |

OTHER PUBLICATIONS

First Office Action from corresponding Japanese Application No. 2024-505507 dated Nov. 25, 2024 with English translation.
International Search Report in corresponding International Application PCT/CN2023/094719 dated Dec. 28, 2023.
Written Opinion of the International Searching Authority in corresponding International Application PCT/CN2023/094719 dated Dec. 28, 2023.

* cited by examiner

IMAGING DEVICE AND IMAGING METHOD THEREOF, AND PRINTER

CROSS-REFERENCE TO RELATED APPLICATION(S)

This is a national stage application filed under 35 U.S.C. 371 based on International Patent Application NO. PCT/CN2023/094719, filed May 17, 2023, which claims priority to Chinese Patent Application No. 202210729934.3 filed with the China National Intellectual Property Administration (CNIPA) on Jun. 24, 2022, the disclosures of which is incorporated herein by reference in its entirety.

TECHNICAL FIELD

The present disclosure relates to the field of printer technology, for example, an imaging device, an imaging method thereof, and a printer.

BACKGROUND

Printers have important applications in modern society. The printing process of the printers mainly includes four stages: power-on, exposure, development, and printing. The printers may be mainly divided into laser printers and light-emitting diode (LED) printers. The LED printers are more and more widely used due to their advantages such as a high printing speed, a good printing image effect, long service life, high degree of freedom, and energy saving and environmental protection.

However, as shown in FIG. 1, FIG. 1 is a diagram illustrating the structure of an imaging device in a printer. The imaging device includes a display chip 1' and a photosensitive drum 2'. Of course, the imaging device also includes a lens array. The display chip 1' includes one or more rows of LED pixels. The LED pixels on the display chip 1' are directly imaged on the photosensitive drum 2' through a projection lens. The imaging resolution is related to the size of a micro lens and the pixel spacing. As a result, the resolution of the imaging device is limited, and the light energy utilization is not high.

SUMMARY

The present disclosure provides an imaging device, an imaging method thereof, and a printer.

According to an aspect of the present disclosure, an imaging device is provided. The imaging device includes M rotatable photosensitive drums, at least one display chip, at least one projection lens, and at least one beam deflection system.

Each rotatable photosensitive drum is configured to form an electronic latent image in a light-receiving region of each photosensitive drum through exposing the light-receiving region M is greater than or equal to 1. The light-receiving region of each photosensitive drum includes multiple light-receiving sub-regions arranged in the axial direction of the photosensitive drum.

Each display chip includes at least two light-emitting regions arranged in a first direction. Light-emitting regions of the at least one display chip have a one-to-one correspondence with light-receiving sub-regions of the M rotatable photosensitive drums. Each light-emitting region is provided with multiple light-emitting units.

The at least one projection lens is in one-to-one correspondence with the at least one display chip. Each projection lens is configured to form an image for a corresponding display chip.

The at least one beam deflection system is in one-to-one correspondence with the at least one display chip. The beam deflection system is configured to deflect an image, which is formed by light from one light-emitting region in a display chip of the at least one display chip through a corresponding projection lens, to a light-receiving sub-region corresponding to the one light-emitting region.

According to another aspect of the present disclosure, a printer is provided. The printer includes a toner cartridge and the preceding imaging device.

According to another aspect of the present disclosure, an imaging method of an imaging device is provided. The imaging device is the preceding imaging device. The light-emitting units of all display chips are arranged in a matrix. All light-emitting regions are imaged in light-receiving sub-regions as multiple pixel points arranged in a matrix along a row direction and a column direction. The included angle between the row direction and the axial direction of each of all photosensitive drums and the included angle between the column direction and the axial direction of each photosensitive drum are each not equal to 90 degrees.

The imaging method includes the steps below.

The preset latent image line of each of all the photosensitive drums is rotated to a position of a corresponding imaging pixel row in all light-receiving regions. The preset latent image line is parallel to the axial direction of each photosensitive drum. The corresponding imaging pixel row is parallel to the axial direction of each photosensitive drum. Each imaging pixel line includes multiple imaging pixels. The imaging pixels are pixel points of the multiple pixel points or superposition of at least two pixel points around a pixel point.

All the display chips are turned on to use the corresponding imaging pixel row to photosensitize a partial region of the preset latent image line.

Each photosensitive drum is rotated to move the preset latent image line, and in a case where the preset latent image line moves to the next imaging pixel row, all the display chips are turned on.

DETAILED DESCRIPTION

The technical solutions in embodiments of the present disclosure are described clearly and completely in conjunction with the drawings in embodiments of the present disclosure. Apparently, the embodiments described hereinafter are part, not all, of embodiments of the present disclosure. It is to be noted that the terms "first" and "second" in the description, claims and drawings of the present disclosure are used to distinguish between similar objects and are not necessarily used to describe a particular order or sequence. It should be understood that the data used in this way is interchangeable where appropriate so that the embodiments of the present disclosure described herein can also be implemented in a sequence not illustrated or described herein. In addition, terms "including" and "having" or any variations thereof are intended to encompass a non-exclusive inclusion. For example, a process, method, system, product or apparatus that includes a series of steps or units not only includes the listed steps or units but may also include other steps or units that are not expressly listed or are inherent to such a process, method, system, product or apparatus.

Figure 1:
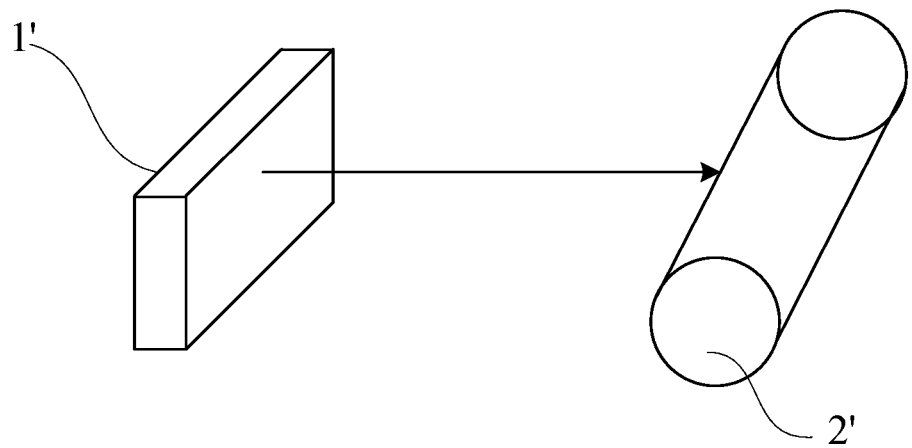
FIG. 1 is a diagram illustrating the structure of an imaging device in a printer.
Figure 2:
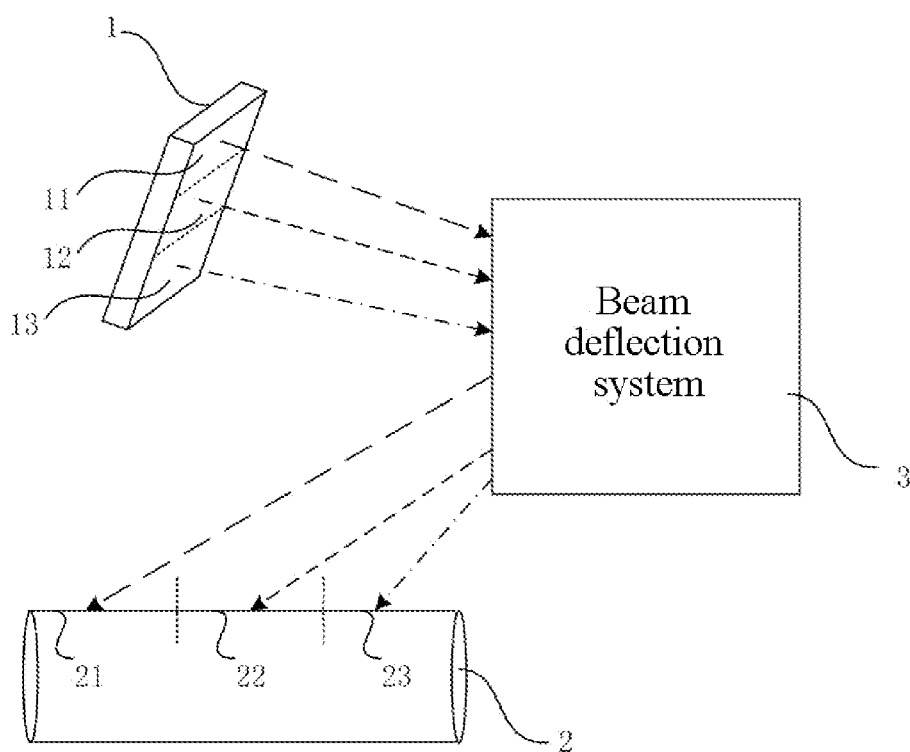
FIG. 2 is a diagram illustrating the structure of an imaging device according to an embodiment of the present disclosure.

FIG. 2 is a diagram illustrating the structure of an imaging device according to an embodiment of the present disclosure. Referring to FIG. 2, the imaging device includes M rotatable photosensitive drums 2, at least one display chip 1, at least one projection lens 5, and at least one beam deflection system 3. A photosensitive drum 2 is configured to form an electronic latent image in a light-receiving region of the photosensitive drum 2 through exposing the light-receiving region. M is greater than or equal to 1. The light-receiving region of the photosensitive drum 2 includes multiple light-receiving sub-regions arranged in the axial direction of the photosensitive drum 2. The multiple light-receiving sub-regions are spliced into a light-receiving region. Each display chip includes at least two light-emitting regions arranged in a first direction. The at least two light-emitting regions have a one-to-one correspondence with multiple light-receiving sub-regions of the M photosensitive drums. Each light-emitting region is provided with multiple light-emitting units. The at least one projection lens is in one-to-one correspondence with the at least one display chip 1. The projection lens is configured to form an image for the display chip. The at least one beam deflection system 3 corresponds to the at least one display chip 1. Each beam deflection system 3 is configured to deflect an image, which is formed by light from one light-emitting region in the display chip 1 through a projection lens, to a light-receiving sub-region corresponding to the one light-emitting region.

It is to be noted that in this embodiment, the included angle between the first direction and the axial direction of the photosensitive drums may be any value.

In an embodiment, the imaging device may be applied to a printer. The display chip 1 includes multiple light-emitting units. The working process of the printer may include after the printer is powered on and started, controlling the rotation of a photosensitive drum 2 according to the received print task. A charging roller above the photosensitive drum 2 powers on the selenium material on the surface of the photosensitive drum 2. After the power-on is completed, the entire surface of the photosensitive drum 2 is charged. When the response position on the photosensitive drum 2 is rotated to a light-receiving region, the display chip 1 is lit, and the emitted light irradiates the surface of the photosensitive drum 2. Since selenium is a semiconductor material, selenium becomes a conductor when exposed to light. The charge carried by a pixel point corresponding to the part irradiated by the light disappears, while the charge corresponding to the part not irradiated by the light still exists. This causes an electrostatic latent image having uneven charge to be formed on the entire surface of a photosensitive drum. When the photosensitive drum 2 continues to rotate to the position of a toner cartridge, since toner is a ferromagnetic material and is not charged and the surface of the photosensitive drum 2 is negatively charged, the toner transported through a developing roller may be adsorbed to the position where the surface of the photosensitive drum 2 is charged, and the entire print image may appear on the photosensitive drum 2. Moreover, print paper moves in a paper feeding direction, and a transfer roller below the photosensitive drum 2 is charged. When the paper moves between the transfer roller and the photosensitive drum 2, under the action of the transfer roller, the toner on the surface of the photosensitive drum 2 is adsorbed onto the paper. When the paper moves to a fuser, the fuser heats the toner. The toner melts and is fixed on the surface of the paper to form a real print image. Finally, the photosensitive drum 2 is rotated to the position of a discharge lamp, and the discharge lamp irradiates the photosensitive drum 2. After the irradiation, the charges on the surface of the photosensitive drum 2 are completely eliminated. After the cleaning of a cleaner, the entire printing process is completed.

In this embodiment, the imaging device may include one photosensitive drum 2, which can print grayscale images, or the imaging device may include four photosensitive drums. The four photosensitive drums are configured to absorb toner of different colors, so that color printing may be performed. As shown in FIG. 2, for example, the display chip 1 includes three light-emitting regions: a first light-emitting region 11, a second light-emitting region 12, and a third light-emitting region 13. Accordingly, the photosensitive drum 2 includes three light-receiving sub-regions: a first light-receiving sub-region 21, a second light-receiving sub-region 22, and a third light-receiving sub-region 23. At least two light-emitting regions are in one-to-one correspondence with multiple light-receiving sub-regions corresponding to the M photosensitive drums, which means that the number of light-emitting regions on the display chip is the same as the total number of light-receiving sub-regions on the M photosensitive drums, and one light-emitting region corresponds to one light-receiving sub-region. On the same photosensitive drum 2, a light-receiving region may be formed by splicing multiple light-receiving sub-regions. The projection lens may image each light-emitting region in the display chip 1, and the projection lens projects and images all the light-emitting regions of the display chip. In this embodiment, each light-emitting region on the display chip 1 can be imaged to the beam deflection system 3 after being imaged by the projection lens. Images corresponding to different light-emitting regions are imaged to different positions of the beam deflection system 3 respectively, and are subsequently deflected by the beam deflection system 3 and then emitted to corresponding light-receiving sub-regions. For example, in FIG. 2, the image corresponding to the first light-emitting region 11 is deflected to the first light-receiving sub-region 21 after passing through the beam deflection system 3. The image corresponding to the second light-emitting region 12 is deflected to the second light-receiving sub-region 22 after passing through the beam deflection system 3. The image corresponding to the third light-emitting region 13 is deflected to the third light-receiving sub-region 23 after passing through the beam deflection system 3. It can be seen that in this embodiment, all the light-emitting regions on the display chip 1 can be imaged to the light-emitting regions of the photosensitive drum 2. An electrostatic latent image line in the axial direction of the photosensitive drum is formed by splicing corresponding images corresponding to different light-emitting regions. Thus, high-resolution printing may be implemented by using a low-resolution pixel array, and the utilization rate of the light-emitting region on the display chip 1 is greatly improved. It is to be noted that the light-receiving region of the photosensitive drum indicates that light can reach the surface of the photosensitive drum in the light-receiving region, and the photosensitive drum can only be photosensitive when the corresponding position on the photosensitive drum is rotated to the light-receiving region. The light-receiving region can be limited by a fixed slit. When the photosensitive drum is rotated, the slit is fixed.

In the technical solutions of this embodiment, in the adopted imaging device, the beam deflection system is configured to image images corresponding to all the light-emitting regions on the display chip to the photosensitive drum. Thus, high-resolution printing may be implemented by using a low-resolution pixel array, and the utilization rate of the light-emitting region on the display chip is greatly improved, thereby increasing the width of the latent image on the photosensitive drum.

In addition, it is to be noted that the imaging device also includes a correction mirror. The correction mirror is disposed in a light-receiving region and may deflect the light emitted from the beam deflection system 3, so that the light is basically vertically incident on the photosensitive drum for imaging. Thus, the uniformity of the sizes of the imaging pixels on the photosensitive drum is ensured. Of course, when the selected projection lens has a large depth of field, and the image sizes of the display pixels on the photosensitive drum at different positions are basically the same, the correction mirror may not be used.

Figure 3:
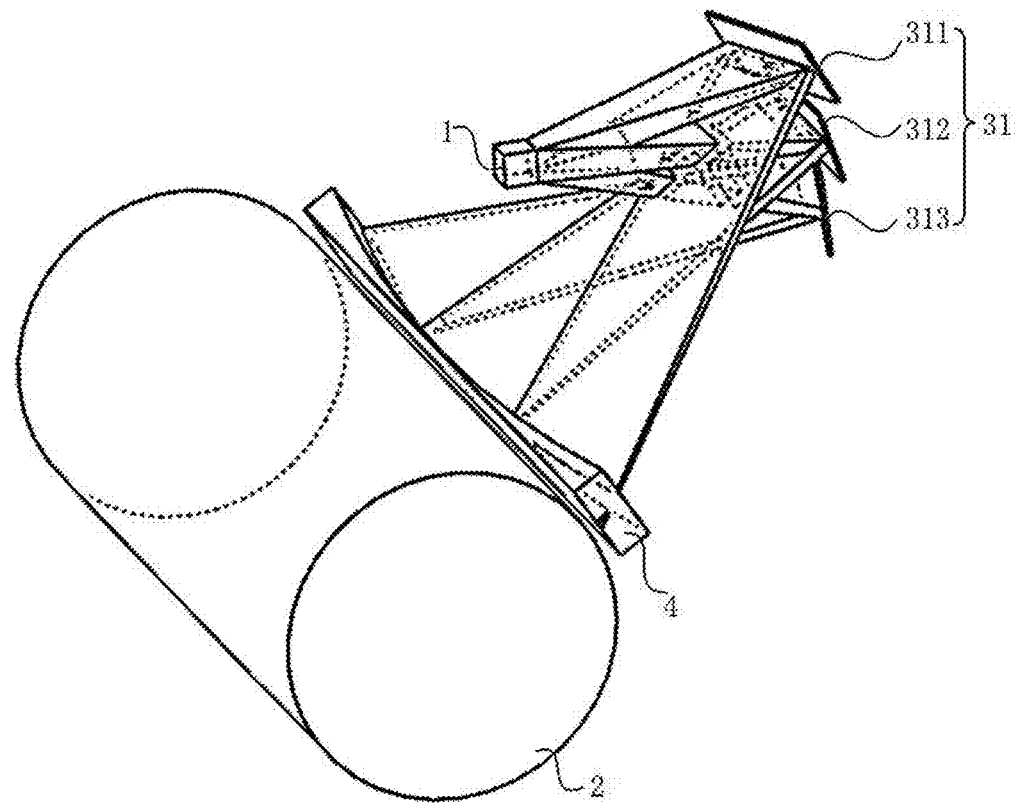
FIG. 3 is a diagram illustrating the structure of another imaging device according to an embodiment of the present disclosure.
Figure 4:
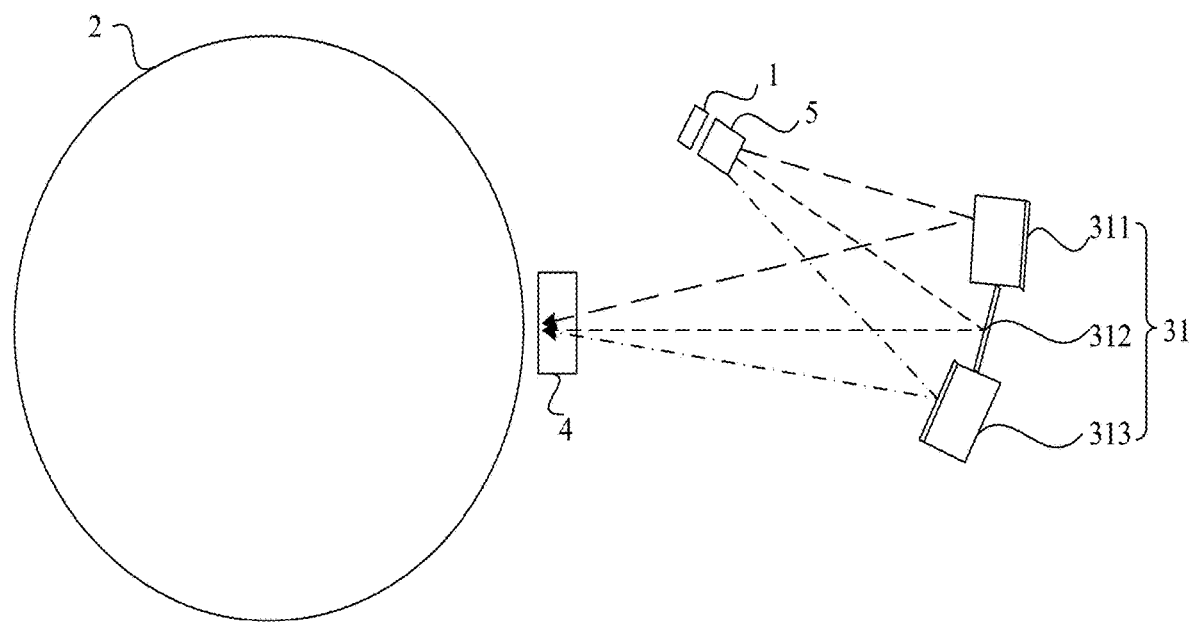
FIG. 4 is a side view of FIG. 3.

In an embodiment, FIG. 3 is a diagram illustrating the structure of another imaging device according to an embodiment of the present disclosure. FIG. 4 is a side view of FIG. 3. Referring to FIGS. 3 and 4, the beam deflection system 3 includes M beam deflection assemblies 31 corresponding to the M photosensitive drums in a one-to-one manner. Each beam deflection assembly 31 includes at least two reflective mirrors. Each reflective mirror corresponds to a light-emitting region in the display chip 1. The rotation angle of the reflective mirror with respect to the photosensitive drum is a first preset range, and the inclination angle of the reflective mirror with respect to the photosensitive drum is a second preset range. The reflective mirror is configured to deflect an image, which is formed by one light-emitting region through the projection lens 5, to a light-receiving sub-region corresponding to the one light-emitting region.

In an embodiment, the display chip 1 and the projection lens 5 may form a component, which may be referred to as a display module.

In an embodiment, the rotation angle of the reflective mirror 312 with respect to the photosensitive drum 2 may be 0. Thus, the first preset range may include 0.

In an embodiment, the inclination angle is related to an included angle Q between the optical axis of the projection lens and the vertical line of the plane where the slit of a photosensitive surface is located. The inclination angle may be approximately equal to half of the included angle Q. To minimize the volume of the system, Q is typically set to 5 to 10 degrees. Thus, the second preset range may be 2.5 to 5 degrees.

In an embodiment, the rotation angle of the reflective mirror 311 with respect to the photosensitive drum 2 is θ, and the inclination angle of the reflective mirror 311 with respect to the photosensitive drum is φ. The value of θ satisfies:

$$\theta = \operatorname{atan}\left(\frac{W/4}{h}\right)$$

W denotes the width of the photosensitive region of the photosensitive drum. h denotes the distance from the center of the reflective mirror 312 to the photosensitive drum. a tan denotes an inverse tangent function. For example, when A4 paper is printed, and the width W of the photosensitive region of the photosensitive drum=210 mm, and h=100 mm, θ=27.7 degrees.

In an embodiment, the magnitude of the inclination angle Φ of the reflective mirror 311 is >Q/2.

In an embodiment, the rotation angle of and the inclination angle of a third reflective mirror 313 may be −θ and −Φ respectively.

In this embodiment, one display chip 1 and one photosensitive drum 2 are used as an example. At this time, the beam deflection system includes one beam deflection assembly. The number of beam deflection assemblies is the same as the number of photosensitive drums. When the number of photosensitive drums is four, the number of beam deflection assemblies is four. Each beam deflection assembly 31 includes at least two reflective mirrors. In this embodiment, description is given by using an example in which the beam deflection assembly 31 includes a first reflective mirror 311, a second reflective mirror 312, and a third reflective mirror 313. For example, the display chip 1 includes three light-emitting regions, and the light-receiving region of the photosensitive drum 2 includes three light-receiving sub-regions. The light from the first light-emitting region after being imaged by the projection lens is emitted to the first reflective mirror 311, deflected by the first reflective mirror 311, and then incident to the first light-receiving sub-region of the photosensitive drum through the correction mirror 4. The light from the second light-emitting region after being imaged by the projection lens is emitted to the second reflective mirror 312, deflected by the second reflective mirror 312, and then incident to the second light-receiving sub-region of the photosensitive drum through the correction mirror 4. The light from the third light-emitting region after being imaged by the projection lens is emitted to the third reflective mirror 313, deflected by the third reflective mirror 313, and then incident to the third light-receiving sub-region of the photosensitive drum through the correction mirror 4. The first light-receiving sub-region, the second light-receiving sub-region, and the third light-receiving sub-region are seamlessly spliced into the light-receiving region of the photosensitive drum, so that the light-emitting units of all the light-emitting regions on the display chip 1 can be imaged on the photosensitive drum. In this manner, the utilization efficiency of the light-emitting regions on the display chip is greatly improved. The value range of the rotation angle of each reflective mirror with respect to the photosensitive drum 2 is not necessarily the same, and the value range of the inclination angle is not necessarily the same, that is, first value ranges corresponding to different reflective mirrors may be different, and second value ranges may be different, as long as each reflective mirror can deflect corresponding light to a corresponding light-receiving sub-region. In this embodiment, the three reflective mirrors have different rotation angles and inclination angles with respect to the correction mirror or the light-receiving region of the photosensitive drum. The inclination angle of a reflective mirror with respect to the light-receiving region of the photosensitive drum is configured to adjust the position of an imaging beam in the rotation direction of the photosensitive drum 2. The rotation angle of the reflective mirror with respect to the light-receiving region of the photosensitive drum is configured to adjust the position of the imaging beam in the axial direction of the photosensitive drum 2. For example, the second reflective mirror 312 merely tilts with respect to the photosensitive drum, so that one of the beams of light emitted from the projection lens located obliquely above the second reflective mirror 312 is reflected to the correction mirror and is deflected by the correction mirror 4 and then incident on the second light-receiving sub-region on the photosensitive drum 2. The first reflective mirror 311 and the third reflective mirror 313 not only have an inclination angle but also a rotation angle with respect to the light-receiving region of the photosensitive drum 2, and their inclination and rotation angle directions are also different. The light beams emitted from the first light-emitting region and the third light-emitting region on the display chip are incident on the first reflective mirror 311 and the third reflective mirror 313 respectively after passing through the projection lens and then are incident on the first light-receiving sub-region and the third light-receiving sub-region respectively after passing through the correction mirror. The rotation angle and inclination angle of a reflective mirror with respect to the light-receiving region of the photosensitive drum are adjusted, so that it is possible to enable the emitted light from the three light-emitting regions to be incident on the correction mirror. On the display chip, in the first direction, the width of each light-emitting region may be set to be the same, that is, each light-emitting region includes the same number of pixels in the first direction. After reflection by the reflective mirror and correction by the correction mirror, the images formed by each light-emitting region on the photosensitive drum have the same width in the rotation direction of the photosensitive drum and are spliced into an image that fills the light-receiving region in the axial direction of the photosensitive drum.

In this embodiment, the function of the beam deflection system may be implemented by the beam deflection assembly composed of the reflective mirrors. The structure is simple, so that the cost of the imaging device can be reduced, and at the same time, the size of an imaging system can be reduced.

Figure 5:
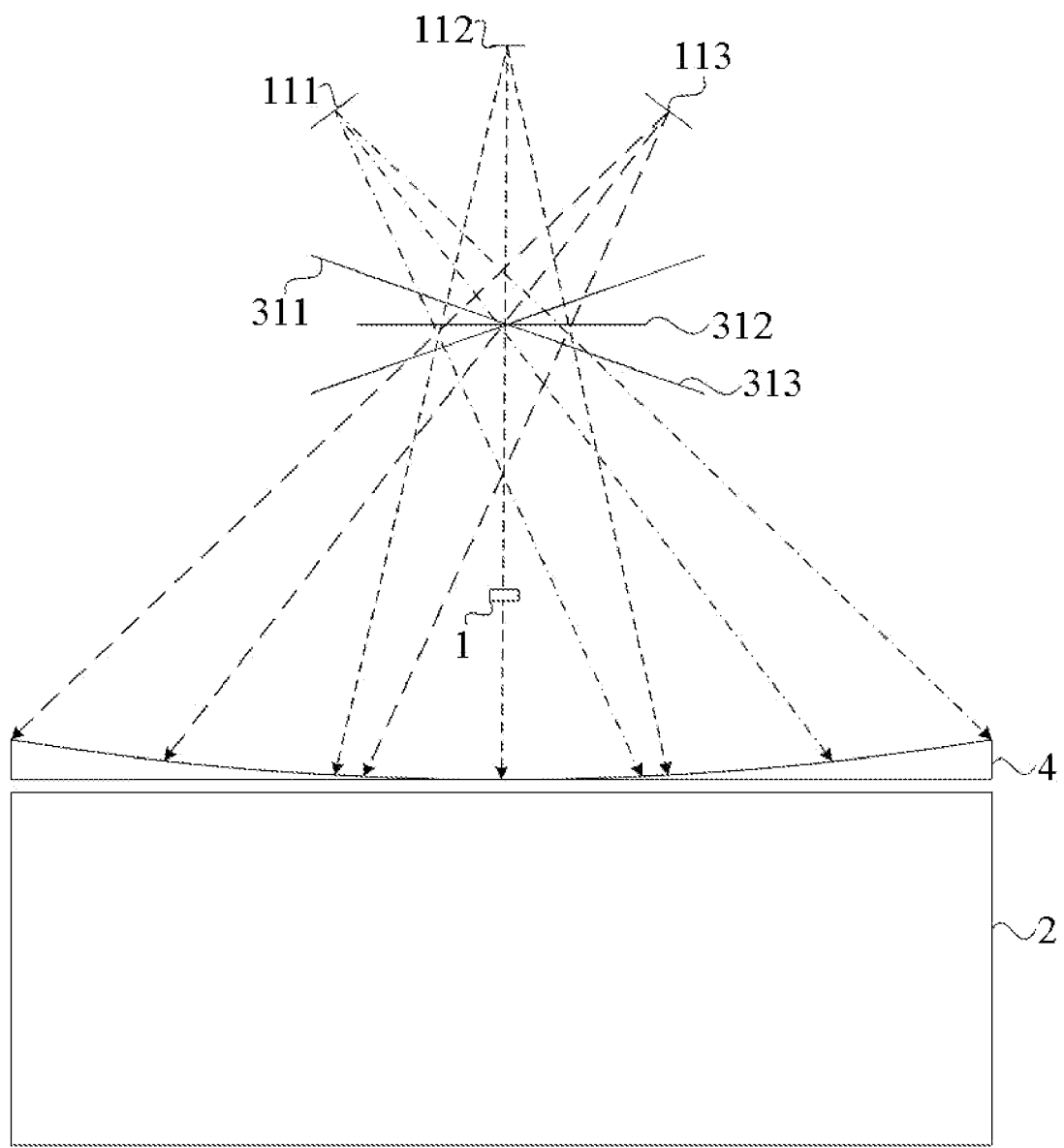
FIG. 5 is a top view of FIG. 3.

In an embodiment, FIG. 5 is a top view of FIG. 3. In FIG. 5, the virtual images of the display chip 1 formed by three reflective mirrors are a first virtual image 111, a second virtual image 112, and a third virtual image 113 respectively. Referring to FIG. 5, in this embodiment, a reflective mirror is configured to deflect an image formed by one light-emitting region through a projection lens to a light-receiving sub-region corresponding to the one light-emitting region and a portion of another light-receiving sub-region adjacent to the light-receiving sub-region corresponding to the one light-emitting region.

In an embodiment, the size of a light-emitting region in a length direction (the length direction is perpendicular to the first direction) and/or the focal length of the projection lens may be configured, so that the length of the image formed by the light-emitting region after passing through the projection lens is larger than the length of a corresponding light-receiving sub-region. Moreover, the rotation angle and the inclination angle of a reflective mirror are configured, so that after an imaging beam is deflected by the reflective mirror, the imaging beam not only covers the area of a corresponding light-receiving sub-region, but also covers the area of the light-receiving sub-region adjacent to the corresponding light-receiving sub-region (one light-receiving sub-region or two light-receiving sub-regions). In this manner, it is ensured that all parts of the light-receiving region of the photosensitive drum can be covered by the imaging beam. For example, the overlapping part may be understood as a splicing region. The rotation angle of the reflective mirror may be adjusted, so that the size of the splicing region may be controlled. The splicing region is configured to ensure that the three imaging beams projected onto the photosensitive drum are not misaligned and missing during splicing.

When a splicing region is disposed on the photosensitive drum, since the splicing region can receive the imaging beams of different light-emitting regions, the overlapping may occur during printing. A test page is printed, so that it is possible to analyze which light-emitting region is better used for printing the splicing region and then determine the pixels that light up when the splicing region is sensitive to light. For example, in a splicing region formed by the first light-receiving sub-region and the second light-receiving sub-region, the result of printing the test page is that the imaging effect of the first light-emitting region in the splicing region is superior to the imaging effect of the second light-emitting region in the splicing region. Therefore, the splicing region may be imaged by the first light-emitting region, and pixels corresponding to the splicing region in the second light-emitting region are turned off during imaging. For example, when the test page is printed, the results when only the first light-emitting region is illuminated and when only the second light-emitting region is illuminated can be printed out separately, and the printing effects on the splicing regions in the two test pages are analyzed. For example, the printing effects may be determined by the sharpness of the printed pixels.

Figure 6:
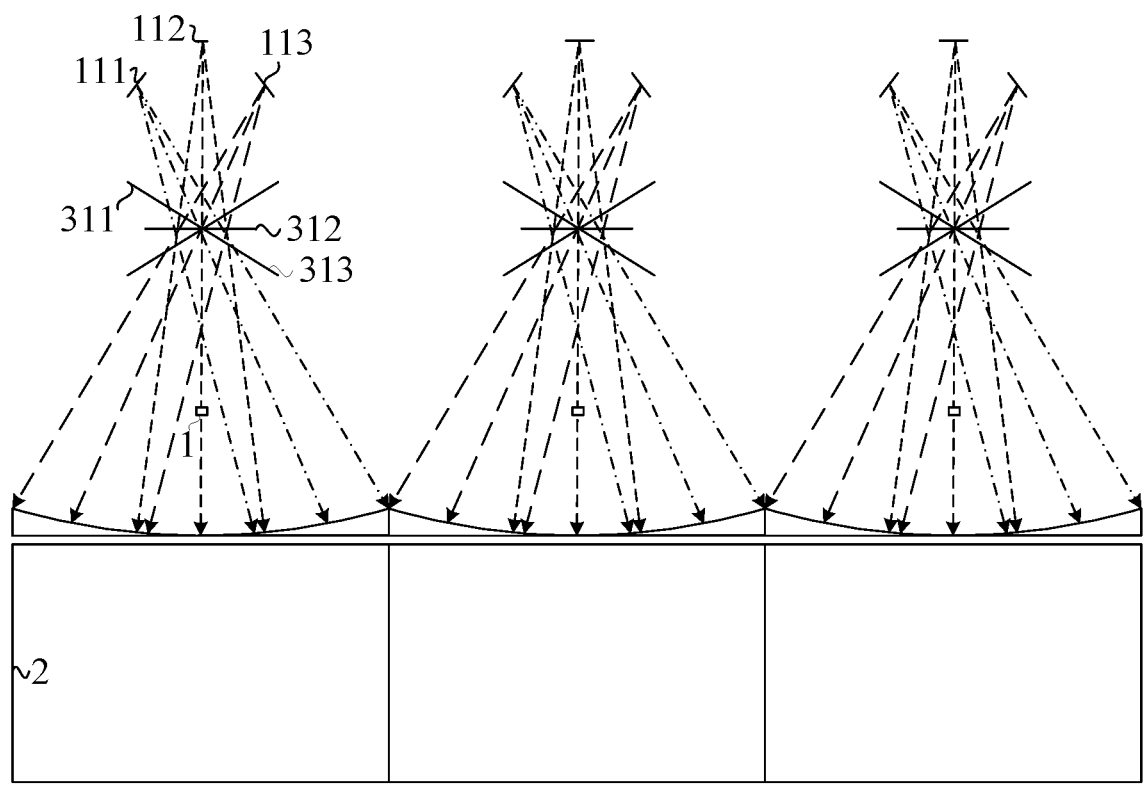
FIG. 6 is a diagram illustrating the structure of another imaging device according to an embodiment of the present disclosure.

FIG. 6 is a diagram illustrating the structure of another imaging device according to an embodiment of the present disclosure. Referring to FIG. 6, the imaging device includes at least two display chips 1 and at least two beam deflection systems. Each beam deflection system is configured to deflect an image, which is formed by a light-emitting region in a display chip through the projection lens, to a corresponding preset region. Each preset region includes multiple adjacent light-receiving sub-regions.

In this embodiment, each photosensitive drum may correspond to multiple display chips. This embodiment may be applied to the case where the photosensitive drum has a larger imaging width with respect to a display chip (for example, the photosensitive drum may be longer, and the width of the imaging region of the display chip is smaller). As shown in FIG. 6, for example, the photosensitive drum 2 is imaged by the light emitted from three display chips. Each display chip corresponds to a preset region of the light-receiving region of the photosensitive drum, that is, the light-receiving region of the photosensitive drum is formed by splicing three preset regions. It is to be noted that each preset region includes multiple light-receiving sub-regions, that is, the optical path diagram corresponding to each preset region is the same as the optical path diagram shown in FIG. 5. The optical path between each display chip and the corresponding preset region on the photosensitive drum is not described herein. In this embodiment, multiple display chips may be used to irradiate the photosensitive drum, so that the photosensitive drum may be set longer in the axial direction. Regions on the photosensitive drum that are sensitive to light at the same time may be further increased, and a complete electrostatic latent image is generated faster, thereby further increasing the printing speed.

In an embodiment, in the imaging device shown in FIG. 6, adjacent preset regions may be configured to partially overlap.

In an embodiment, the size of a display chip in a length direction (the length direction is perpendicular to the first direction) and/or the focal length of the projection lens may be configured, so that the length of the image formed by the display chip after passing through the projection lens is larger than the length of a corresponding preset region. Moreover, the rotation angle and the inclination angle of a reflective mirror are configured, so that after an imaging beam is deflected by the reflective mirror, the imaging beam not only covers the area of a corresponding preset region, but also covers the area of the preset region (one preset region or two preset regions) adjacent to the corresponding preset region. In this manner, it is possible to ensure that all parts of the light-receiving region of the photosensitive drum can be covered by the imaging beam. For example, the overlapping part may be understood as a splicing region. The rotation angle of the reflective mirror may be adjusted, so that the size of the splicing region may be controlled. The splicing region is configured to ensure that the three imaging beams projected onto the photosensitive drum are not misaligned and missing during splicing.

When a splicing region is disposed on the photosensitive drum, since the splicing region can receive the imaging beams of different light-emitting regions, the overlapping may occur during printing. A test page is printed, so that it is possible to analyze which light-emitting region is better used for printing the splicing region and then determine the pixels that light up when the splicing region is sensitive to light.

Figure 7:
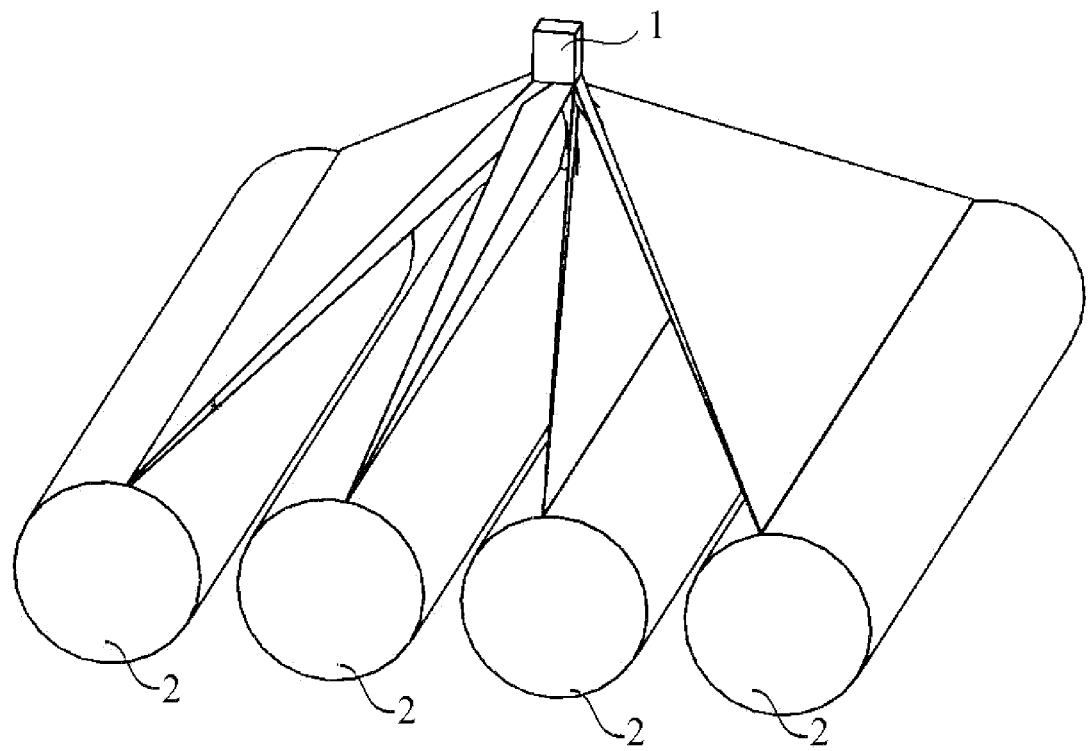
FIG. 7 is a diagram illustrating the structure of another imaging device according to an embodiment of the present disclosure.

In the preceding embodiment, one photosensitive drum is used as an example for description. In some other embodiments, there may also be four photosensitive drums as shown in FIG. 7. FIG. 7 is a diagram illustrating the structure of another imaging device according to an embodiment of the present disclosure. In this embodiment, the imaging device includes one display chip 1 and four photosensitive drums 2. Each photosensitive drum 2 is configured to absorb toner of a different color. The four photosensitive drums may be a photosensitive drum for adsorbing black toner, a photosensitive drum for adsorbing red toner, a photosensitive drum for adsorbing blue toner, and a photosensitive drum for adsorbing yellow toner. The black photosensitive drum may print a black portion, the red photosensitive drum may print a red portion, the blue photosensitive drum may print a blue portion, and the yellow photosensitive drum may print a yellow portion. Four photosensitive drums are used to print different colors, and after superposition, various color patterns are formed as required. In this embodiment, each photosensitive drum 2 corresponds to a beam deflection assembly. The light-receiving sub-region on each photosensitive drum corresponds to a light-emitting region on the display chip 1. Different light-emitting regions correspond to different light-receiving sub-regions. For example, each photosensitive drum is provided with three light-receiving sub-regions, and there are a total of twelve light-receiving sub-regions in the four photosensitive drums. Each beam deflection assembly includes three reflective mirrors. The display chip includes a total of twelve light-emitting regions. The twelve light-emitting regions are in one-to-one correspondence with the twelve light-receiving sub-regions. A corresponding light-emitting region on the display chip 1 is controlled to be lit, so that the printing of color images is controlled. In addition, the splicing region described by the embodiment corresponding to FIG. 4 is also applicable to this embodiment. Of course, in some other embodiments, a light beam deflection assembly may not be provided. For example, four regions of the display chip may be configured to be projected and imaged directly to the light-receiving region through the projection lens. The window positions of the light-receiving regions of the four photosensitive drums may be different, so that four light beams may be directed to the axial direction of the photosensitive drums as much as possible.

Figure 8:
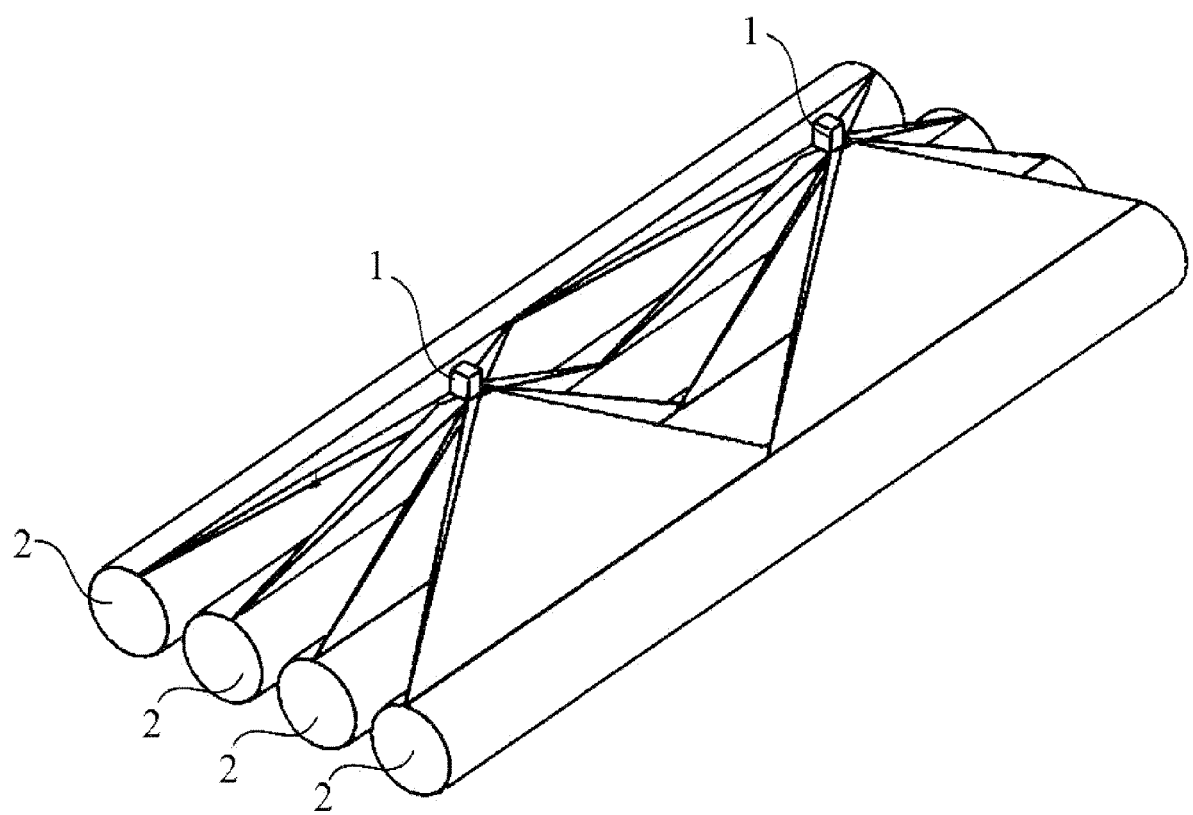
FIG. 8 is a diagram illustrating the structure of another imaging device according to an embodiment of the present disclosure.

FIG. 8 is a diagram illustrating the structure of another imaging device according to an embodiment of the present disclosure. As shown in FIG. 8, in this embodiment, the imaging device may include four photosensitive drums, which is identical to the structure shown in FIG. 6. Different from the structure shown in FIG. 7, this embodiment includes two display chips 1 and two beam deflection systems in one-to-one correspondence with the display chips 1. Each beam deflection system includes four beam deflection assemblies. The image formed on each photosensitive drum 2 is from two display chips. The splicing region described by the embodiment corresponding to FIG. 5 is also applicable to this embodiment. Of course, it is to be noted that each display chip corresponds to a projection lens. In some other embodiments, a light beam deflection assembly may not be provided. For example, four regions of the display chip may be configured to be projected and imaged directly to the light-receiving region through the projection lens. The window positions of the light-receiving regions of the four photosensitive drums may be different, so that four light beams may be directed to the axial direction of the photosensitive drums as much as possible.

Figure 9:
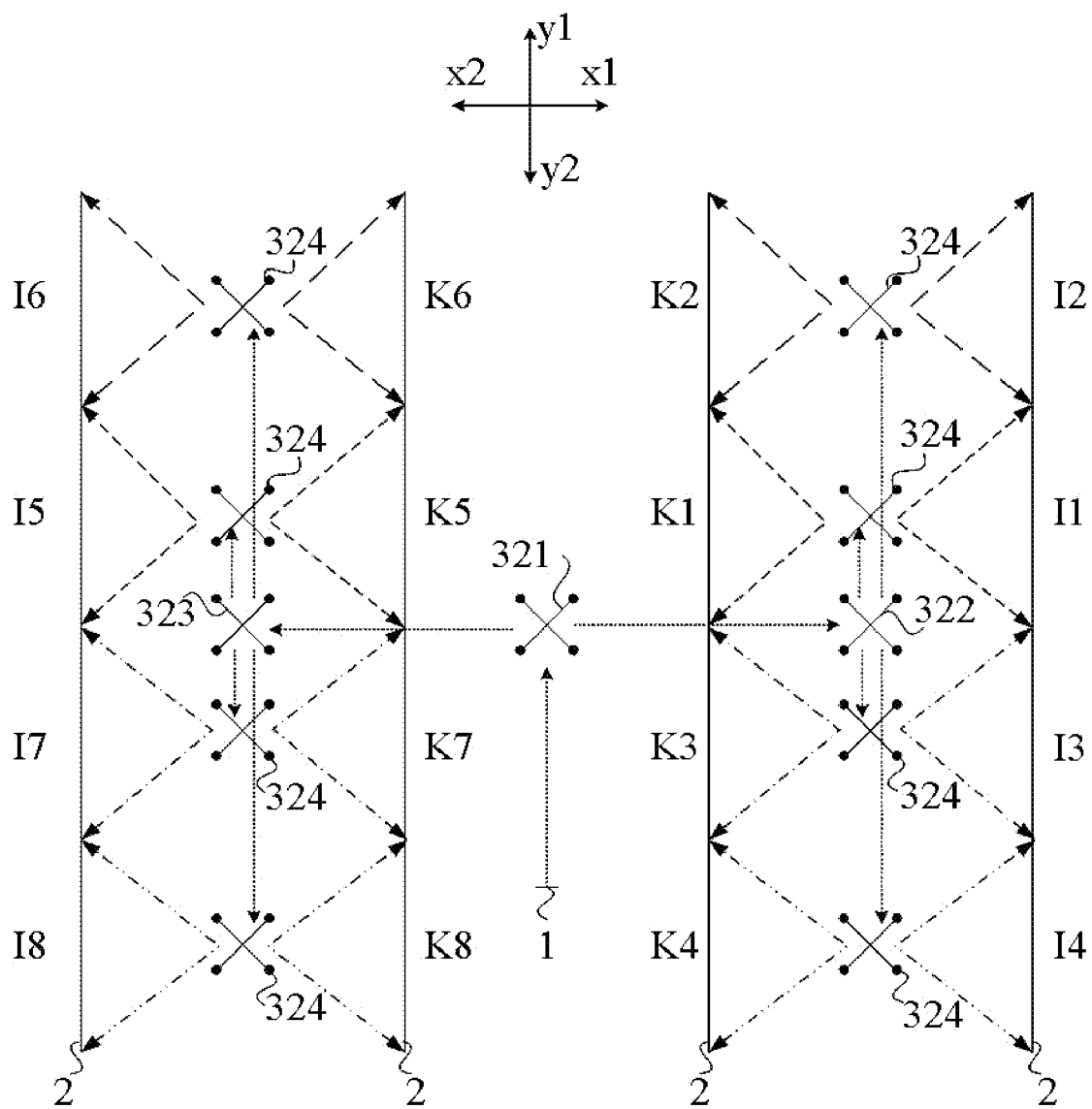
FIG. 9 is a diagram illustrating the structure of another imaging device according to an embodiment of the present disclosure.

In an embodiment, FIG. 9 is a diagram illustrating the structure of another imaging device according to an embodiment of the present disclosure. Referring to FIG. 9, the imaging device includes one display chip 1 and four photosensitive drums 2. Each photosensitive drum 2 is configured to absorb toner of a different color. The first photosensitive drum to the fourth photosensitive drum are arranged in a second direction x1 in sequence. In the second direction x1, the projections of the four photosensitive drums 2 coincide. The axial direction of each photosensitive drum is perpendicular to the second direction x1. The display chip 1 includes 4*N light-emitting regions. N is an even number greater than 2. The beam deflection system 3 includes a primary image splitting mirror 321, a first secondary image splitting mirror 322, and a second secondary image splitting mirror 323.

In the second direction x1, the projection of the primary image splitting mirror 321 does not overlap projections of the four photosensitive drums. In a third direction, the projection of the primary image splitting mirror is located between the second photosensitive drum and the third photosensitive drum. The third direction is perpendicular to both the axial direction of the four photosensitive drums and the second direction. The primary image splitting mirror 321 is configured to emit part of emitted light of each light-emitting region of the display chip 1 in the second direction x1 and emit the other part in a fourth direction x2. The fourth direction x2 is opposite to the second direction x1.

In the third direction, the projection of the first secondary image splitting mirror 322 is located between the third photosensitive drum and the fourth photosensitive drum. The first secondary image splitting mirror 322 is configured to emit, in a fifth direction y1, part of light which is emitted by the primary image splitting mirror 321 in the second direction x1 and emit remaining part in a sixth direction y2. The fifth direction y1 is opposite to the sixth direction y2. The sixth direction and the fifth direction are each parallel to the axial direction of the four photosensitive drums.

In the third direction, the projection of the second secondary image splitting mirror 323 is located between the first photosensitive drum and the second photosensitive drum. The second secondary image splitting mirror 323 is configured to emit, in the fifth direction y1, part of light which is emitted by the primary image splitting mirror 321 in the fourth direction x2 and emit remaining part in the sixth direction y2.

Each emitted optical path of the secondary image splitting mirrors is provided with at least two region image splitting mirrors 324. Each region image splitting mirror 324 is configured to reflect light corresponding to a light-emitting region on the display chip in the fourth direction x2 and light corresponding to a light-emitting region in the second direction x1. Different region image splitting mirrors 324 correspond to different light-emitting regions on the display chip.

A reflective mirror is disposed on each emitted optical path corresponding to a region image splitting mirror 324. The reflective mirror is configured to reflect received light to the light-receiving sub-region of a corresponding photosensitive drum.

This embodiment provides another solution for implementing color printing by using one display chip. For ease of understanding, the left direction on the x-axis is defined as the fourth direction x2, the right direction is the second direction x1, the upward direction on the y-axis is the fifth direction y1, the downward direction is the sixth direction y2, and the z-axis direction is the third direction. The number of light-emitting regions on the display chip 1 is related to the number of light-receiving sub-regions on the photosensitive drum. For example, each photosensitive drum is divided into N light-receiving sub-regions, and the display chip 1 needs to be divided into 4*N light-emitting regions.

The light emitted from the display chip 1 is imaged through the projection lens and then emitted to the primary image splitting mirror 321. At this time, the light emitted from all the light-emitting regions can be emitted to the primary image splitting mirror 321. The primary image splitting mirror 321 splits part of the emitted light of each light-emitting region in the second direction x1 and the other part in the fourth direction x2. In other words, at this time, the emitted light from the primary image splitting mirror 321 in the second direction x1 includes emitted light from all the light-emitting regions. For each light-emitting region, it is possible to make the light emitted by part of the light-emitting units emitted in the second direction x1 and the light emitted by the remaining light-emitting units emitted in the fourth direction x2. It is also possible to make part of the light emitted from a light-emitting unit emitted in the second direction x1 and the remaining part emitted in the fourth direction x2. The light emitted from the primary image splitting mirror 321 in the second direction x1 is incident on the first secondary image splitting mirror 322. The structure of the first secondary image splitting mirror 322 is the same as the structure of the primary image splitting mirror. The first secondary image splitting mirror 322 splits part of the incident light in the fifth direction y1 and the other part in the sixth direction y2. The light emitted from the primary image splitting mirror 321 in the fourth direction x2 is incident on the second secondary image splitting mirror 323. The structure of the second secondary image splitting mirror 323 is the same as the structure of the primary image splitting mirror. The second secondary image splitting mirror 323 splits part of the incident light in the fifth direction y1 and the other part in the sixth direction y2. The number of region image splitting mirrors may be determined according to the number of light-receiving sub-regions to be divided.

The number of region image splitting mirrors may be determined according to the number of light-receiving sub-regions to be divided. In this embodiment, for example, each emitted optical path of a secondary image splitting mirror includes two region image splitting mirrors. The light-emitting regions in the display chip 1 are arranged in the third direction, that is, in this embodiment, the first direction and the third direction are equivalent. Images of different light-emitting regions are still arranged in the third direction after being split by the primary image splitting mirror and are still arranged in the third direction after being split by the secondary image splitting mirror. In other words, images corresponding to all the light-emitting regions of the display chip are arranged in the third direction on each emitted optical path of the secondary image splitting mirror. An imaging lens may be disposed between each region image splitting mirror 324 and the corresponding secondary image splitting mirror. The imaging lens is used for imaging. The position and the focal length of the imaging lens and the position of the region image splitting mirror in the third direction are configured, so that each region image splitting mirror emits the images corresponding to two light-emitting regions in the second direction x1 and the fourth direction x2 respectively. In other words, after splitting of the region image splitting mirror, there is only light corresponding to one light-emitting region in each emitted optical path of the region image splitting mirror. Finally, the reflective mirror is then configured to reflect the emitted light from the region image splitting mirror to the light-receiving sub-region of the corresponding photosensitive drum. It is to be noted that the coordinates of each region image splitting mirror in the third direction may be the same or different. For example, the coordinate of the region image splitting mirror 324 corresponding to a light-receiving sub-region I1 and the coordinate of the region image splitting mirror 324 corresponding to a light-receiving sub-region I2 in the third direction are different. The coordinate of the region image splitting mirror corresponding to the light-receiving sub-region I1 and the coordinate of the region image splitting mirror corresponding to the light-receiving sub-region I3 in the third direction may be the same. As shown in the figure, each photosensitive drum includes four light-receiving regions, and the display chip is provided with a total of 16 (4*4) light-emitting regions. After the deflection of the beam deflection system, the light corresponding to each light-emitting region may be deflected to the corresponding light-receiving region.

In this embodiment, one display chip and a beam deflection system may be used to emit images corresponding to all the light-emitting regions on the display chip to corresponding light-receiving sub-regions, that is, one display chip may be used to implement color printing, and the utilization efficiency of the light-emitting region on the display chip is high.

Figure 10:
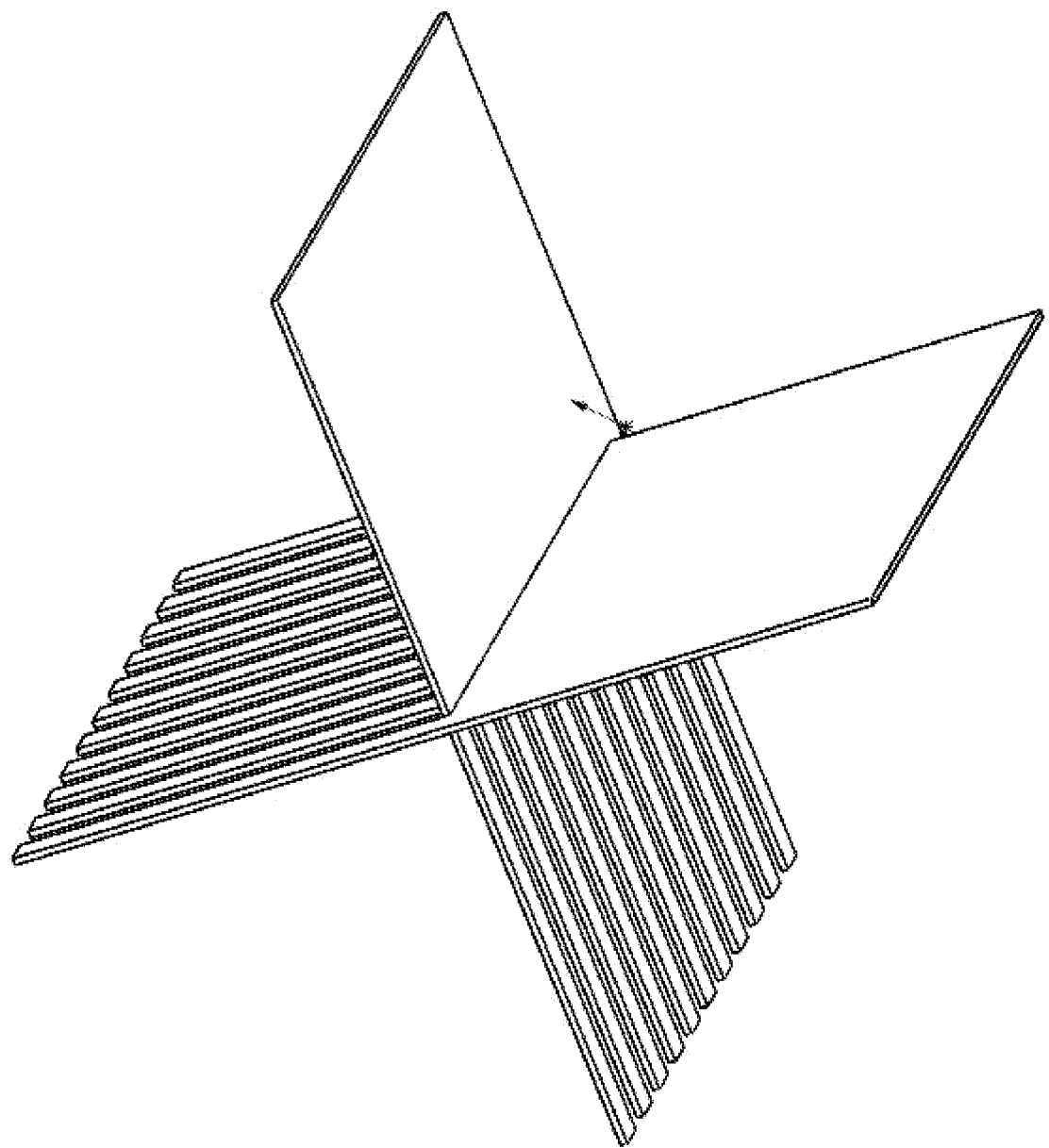
FIG. 10 is a diagram illustrating the structure of a primary image splitting mirror and a secondary image splitting mirror according to an embodiment of the present disclosure.
Figure 11:
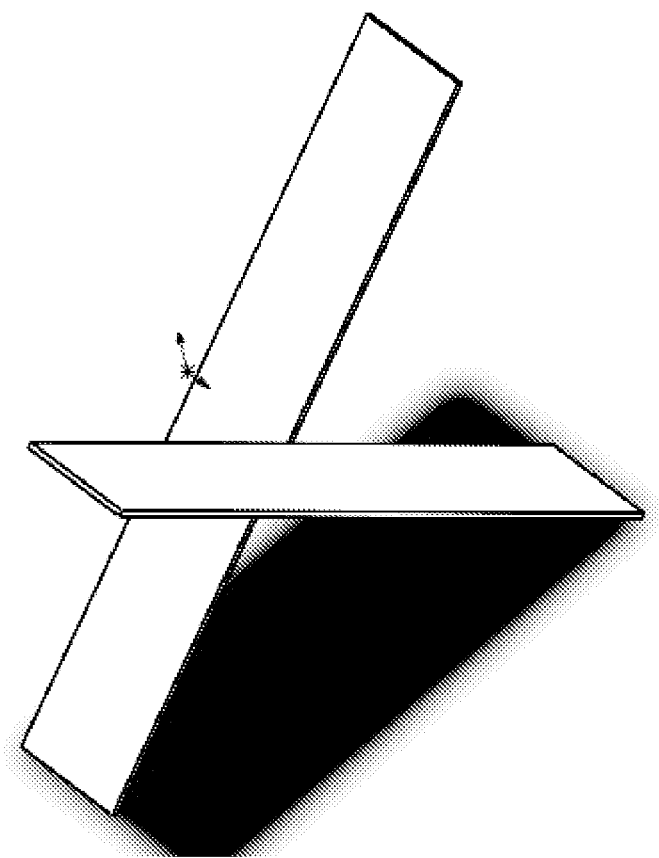
FIG. 11 is a diagram illustrating the structure of a region image splitting mirror according to an embodiment of the present disclosure.

In an embodiment, FIG. 10 is a diagram illustrating the structure of a primary image splitting mirror and a secondary image splitting mirror according to an embodiment of the present disclosure. The image splitting mirror shown in FIG. 10 may be a primary image splitting mirror or a secondary image splitting mirror, that is, the primary image splitting mirror and the secondary image splitting mirror may have the same structure. As shown in FIG. 10, the image splitting mirror is a stereoscopic structure, one side is a continuous reflective mirror, and the other side is a cut and sliced reflective mirror. The image splitting mirror may be composed of two reflective mirrors. Half of each reflective mirror is cut and sliced, so that the cut sliced region is inserted vertically. That is, the two reflective mirrors are perpendicular to each other. At the time of placement, two regions of the image splitting mirror that are cut into strips are used as the incident surfaces for receiving external incident light. At this time, the light beam incident on the image splitting mirror is divided into two light beams in opposite directions. As shown in FIG. 11, FIG. 11 is a diagram illustrating the structure of a region image splitting mirror according to an embodiment of the present disclosure. The image splitting mirror may be a region image splitting mirror. The region image splitting mirror is two consecutive reflective mirrors, so that light corresponding to different light-emitting regions is reflected in the second direction x1 and the fourth direction x2 respectively.

Figure 12:
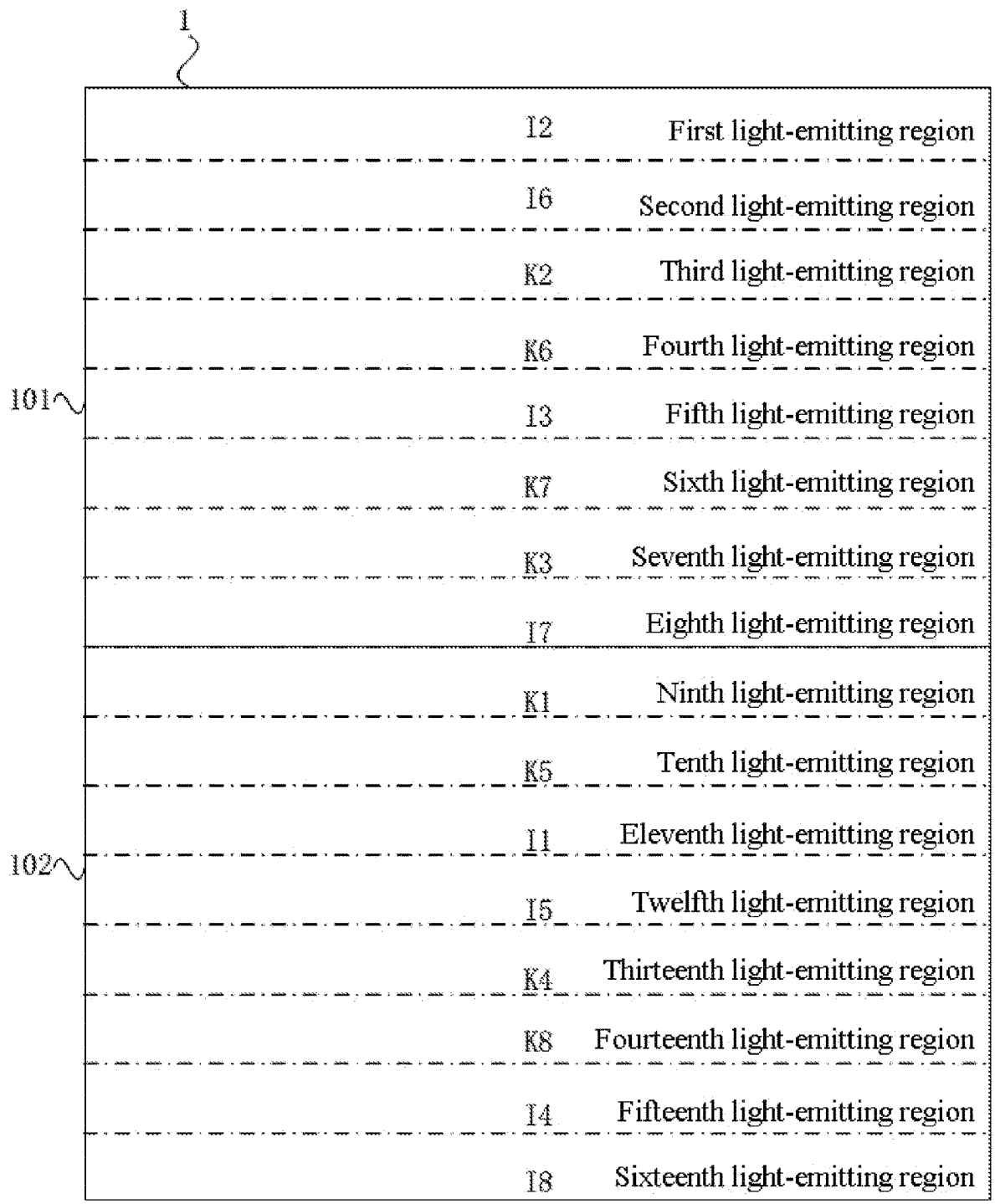
FIG. 12 is a diagram illustrating the structure of region division of a display chip according to an embodiment of the present disclosure.

In an embodiment, FIG. 12 is a diagram illustrating the structure of region division of a display chip according to an embodiment of the present disclosure. In conjunction with FIGS. 9 and 12, the display chip includes two display sub-regions divided by a center line, namely a first display sub-region 101 and a second display sub-region 102. Each display sub-regions includes multiple light-emitting regions. In the first photosensitive drum and the second photosensitive drum, a light-emitting region is located between two spaced light-emitting regions corresponding to light-receiving sub-regions symmetrical about the center line between the first photosensitive drum and the second photosensitive drum. In the third photosensitive drum and the fourth photosensitive drum, a light-emitting region is located between two spaced light-emitting regions corresponding to light-receiving sub-regions symmetrical about the center line between the third photosensitive drum and the fourth photosensitive drum. In multiple light-receiving sub-regions corresponding to the same photosensitive drum, two light-emitting regions corresponding to two adjacent light-receiving sub-regions are located in different display sub-regions.

For example, the display chip includes sixteen light-emitting regions. The sixteen light-emitting regions are the first light-emitting region to the sixteenth light-emitting region. The first light-emitting region to sixteenth light-emitting region are arranged in the first direction in sequence. The first light-emitting region to the eighth light-emitting region are located in the first display sub-region 101. The ninth light-emitting region to the sixteenth light-emitting region are located in the second display sub-region 102. The light-receiving sub-regions in the four photosensitive drums are a light-receiving sub-region I6, a light-receiving sub-region I5, a light-receiving sub-region I7, and a light-receiving sub-region I8 on the first photosensitive drum in the sixth direction y2 in sequence; a light-receiving sub-region K6, a light-receiving sub-region K5, a light-receiving sub-region K7, and a light-receiving sub-region K8 on the second photosensitive drum in the sixth direction y2 in sequence; a light-receiving sub-region K2, a light-receiving sub-region K1, a light-receiving sub-region K3, and a light-receiving sub-region K4 on the third photosensitive drum in the sixth direction y2 in sequence; and a light-receiving sub-region I2, a light-receiving sub-region I1, a light-receiving sub-region I3, and a light-receiving sub-region I4 on the fourth photosensitive drum in the sixth direction y2 in sequence. The light-receiving sub-region I2 and the light-receiving sub-region K2 are symmetrical about the center line between the third photosensitive drum and the fourth photosensitive drum. When the light-receiving sub-region I2 and the light-receiving sub-region K2 correspond to light-emitting regions on the display chip, a light-emitting region may be disposed between the corresponding two light-emitting regions. As shown in FIG. 12, the light-receiving sub-region I2 corresponds to the first light-emitting region, and the light-receiving sub-region K2 corresponds to the third light-emitting region. A second light-emitting region is disposed between the two light-receiving sub-regions. In this embodiment, a light-receiving sub-region corresponds to a light-emitting region, which means that the light-emitting region is incident on the light-receiving sub-region after being deflected by the beam deflection system. In addition, the light-receiving sub-regions on the fourth photosensitive drums are used as an example. The light-receiving sub-region I2 is adjacent to the light-receiving sub-region I1. When the light-receiving sub-region I2 and the light-receiving sub-region I1 correspond to light-emitting regions on the display chip, the light-emitting region corresponding to the light-receiving sub-region I2 and the light-emitting region corresponding to the light-receiving sub-region I1 may be configured to be located in different display sub-regions. As shown in FIG. 12, the light-receiving sub-region I2 corresponds to the first light-emitting region. The first light-emitting region is located in the first display sub-region 101. The light-receiving sub-region I1 corresponds to the eleventh light-emitting region. The eleventh light-emitting region is located in the second display sub-region. According to the corresponding rule between a light-receiving sub-region and a light-emitting region in this embodiment, the light-emitting regions corresponding to the reflected light beams of adjacent region image splitting mirrors on the same emitted optical path of a secondary image splitting mirror may be spaced by a light-emitting region. The light-emitting regions corresponding to the adjacent reflected light beams corresponding to a region image splitting mirror may also be spaced by some light-emitting regions. In this manner, it is ensured that the light emitted from each light-emitting region does not affect each other and that basically all the light incident on the region image splitting mirror is used for imaging.

In the preceding embodiment, it is possible to adjust the coordinate of each region image splitting mirror in the third direction. Of course, in some other embodiments, other rules can also be used for correspondence between a light-receiving sub-region and a light-emitting region.

In an embodiment, for a test point to be printed, the image formed by the preceding imaging apparatus on the photosensitive drum may have multiple pixel points. At this time, a suitable pixel may be selected for correction according to a test page.

In addition, in the preceding embodiment, one display chip can be used to implement imaging of four photosensitive drums of a printer, thereby implementing color printing. Of course, the reflective mirrors may also be reduced according to the needs of the printer to implement grayscale printing of a single photosensitive drum. That is, only one photosensitive drum and the reflective mirror, the secondary image splitting mirror, and the primary image splitting mirror required on the corresponding optical path may be left, and the other secondary image splitting mirror, the region image splitting mirror, and the other reflective mirror are removed.

In an embodiment, the display chip is a micro light-emitting diode (microLED) chip. The MicroLED chip may include a complementary metal oxide semiconductor (CMOS) driver chip of MicroLED and ultra-high-speed refresh. The chip has characteristics such as a small pixel size, high brightness, a high response refresh speed, and multiple grayscales, so that the printer may have advantages such as a high speed, environmental protection, a small volume, bright colors, a low price, high stability and reliability, and long life.

In the embodiments of the present disclosure, a printer is also provided. The printer includes the imaging device provided by any embodiment of the present disclosure. Since the printer includes the imaging device provided by any embodiment of the present disclosure, the printer has the same beneficial effects, and the details are not repeated here.

A 120 pixels per inch (PPI) printer is used as an example. At this time, the size of the latent image pixel of a photosensitive drum is required to be less than 21 microns. A projection lens in which the focal length f=10 mm is selected. When the imaging distance is 40 mm, a reflective mirror is placed between 20 mm and 30 mm away from a correction mirror, and the imaging magnification is about 4 times. At this time, the size of the light-emitting unit on the display chip needs to be 21/4~5 microns.

Figure 13:
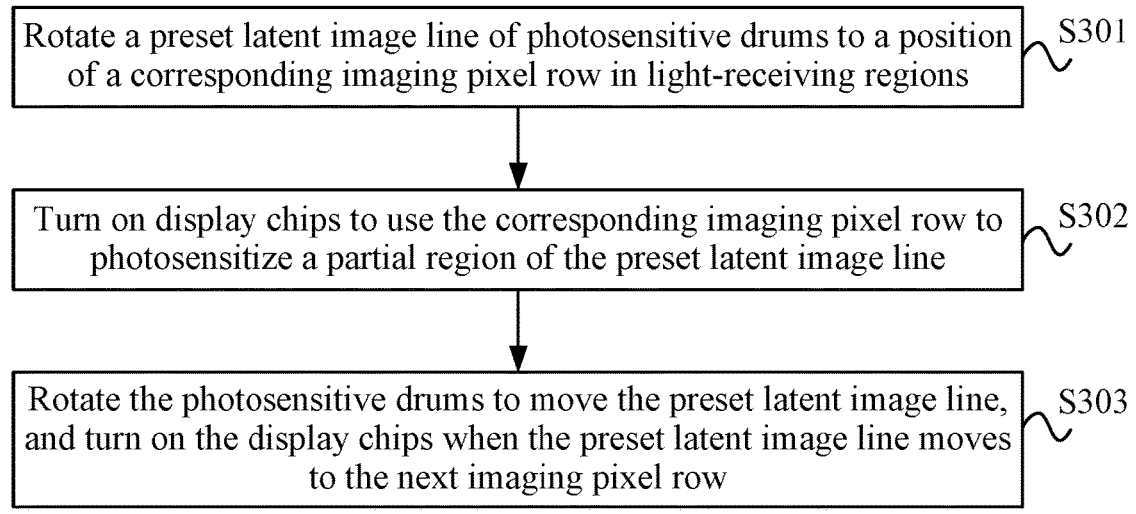
FIG. 13 is a flowchart of an imaging method of an imaging device according to an embodiment of the present disclosure.

However, the display chip having small pixels and a large display array is difficult to manufacture and is prone to occurrence of bad pixels. Based on this, an embodiment provides an imaging method of an imaging device. As shown in FIG. 13, FIG. 13 is a flowchart of an imaging method of an imaging device according to an embodiment of the present disclosure. In the imaging device, multiple light-emitting units on the display chip are arranged in a matrix. Light-emitting regions are imaged in light-receiving sub-regions as multiple pixel points distributed in a matrix along a row direction and a column direction. The included angle between the row direction and the axial direction of a photosensitive drum and the included angle between the column direction and the axial direction of the photosensitive drum are not 90 degrees.

The imaging method includes the steps below.

In step S301, a preset latent image line of photosensitive drums is rotated to a position of a corresponding imaging pixel row in light-receiving regions. The preset latent image line is parallel to the axial direction of the photosensitive drums. The imaging pixel row is parallel to the axial direction of the photosensitive drums. The imaging pixel line includes multiple imaging pixels. The imaging pixels are pixel points or superposition of at least two pixel points around a pixel point.

Figure 14:
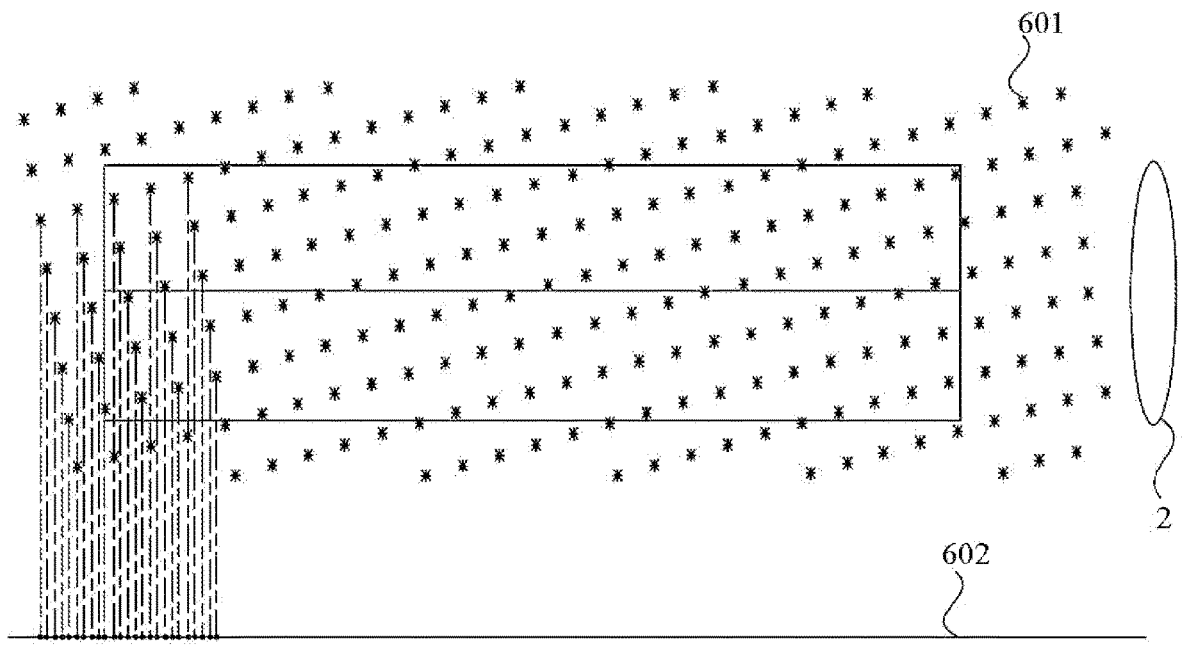
FIG. 14 is a diagram of the relationship between a photosensitive drum and an imaging pixel during imaging of an imaging device according to an embodiment of the present disclosure.

FIG. 14 is a diagram of the relationship between a photosensitive drum and an imaging pixel during imaging of an imaging device according to an embodiment of the present disclosure. As shown in FIG. 14, in this embodiment, the size of the light-emitting unit in the display chip is small, but the pixel spacing is relatively large. For example, the size of the light-emitting unit is microns, and the spacing between light-emitting units is 25 microns. This kind of display chip has a high yield during production. In this embodiment, the relationship between the display chip and the photosensitive drum may be set, so that multiple pixel points 601 formed by the light-emitting units of the display chip on the light-receiving region of the photosensitive drum are arranged as shown in FIG. 14. Although the multiple pixel points 601 are arranged in a matrix in a row direction and a column direction, the included angle between the row direction and the axial direction of a photosensitive drum and the included angle between the column direction and the axial direction of the photosensitive drum are not 90 degrees. The row direction of the pixel points is not parallel to the axial direction of the photosensitive drum. The column direction of the pixel points is also not parallel to the axial direction of the photosensitive drum. The rectangular box in FIG. 14 may be understood as a light-receiving sub-region. The center line in the middle of the rectangular box is the central axis of the light-receiving sub-region. The preset latent image line 602 is a line to be imaged on the photosensitive drum. When the preset latent image line 602 is not rotated to the light-receiving sub-region, the preset latent image line 602 cannot be exposed by the pixel point 601. When the preset latent image line is rotated to the light-receiving sub-region, for example, when the preset latent image line 602 is in the first position of the light-receiving sub-region in the rotation direction of the photosensitive drum, step S302 is performed. The display chip is turned on to use the imaging pixel row to sense light in part of the preset latent image line. That is, the pixel point corresponding to the first position partially exposes the preset latent image line 602.

Subsequently, step S303 is performed. The photosensitive drums are rotated to move the preset latent image line, and the display chips are turned on when the preset latent image line moves to the next imaging pixel row.

In an embodiment, when the preset latent image line 602 fully passes through the light-receiving sub-region, all portions of the preset latent image line 602 are exposed, thereby forming a complete electrostatic latent image corresponding to the preset latent image line 602. Since none of the row direction and the column direction of a pixel point 601 are parallel to the axial direction of the photosensitive drum, when the preset latent image line moves, the preset latent image line may face a row of pixel points 601. At this time, the row of pixel points may be understood as an imaging pixel line. The preset latent image line is exposed by the pixel points on the imaging pixel line. However, the preset latent image line may not face pixel points. At this time, virtual pixel points may be formed by superimposing the brightness of surrounding pixel points 601, so that the virtual pixel points are connected to form an imaging pixel line, and the preset latent image line is exposed by the virtual pixel points.

As can be seen from the preceding analysis, although the space between the light-emitting regions on the display chip is large, the included angle between the row direction of a pixel point and the axial direction of a photosensitive drum and the included angle between the column direction of the pixel point and the axial direction of the photosensitive drum are not 90 degrees, the preset latent image line is exposed for multiple times instead of once when passing through the light-receiving sub-region, and in the axial direction of the photosensitive drum, the imaging points on the preset latent image line are very dense, thereby greatly improving the imaging resolution on the preset latent image line. That is, in this embodiment, the display chip having large pixel spacing may be used to achieve a high-resolution latent image imaging capability with small pixel spacing.

As shown in FIG. 14, the pixel points in the light-receiving sub-region in the axial direction of the photosensitive drum may be understood as splicing fusion pixel points. The splicing fusion pixel points may be used to expose the splicing region in FIG. 5 or FIG. 6.

In an embodiment, the imaging method also includes simultaneously imaging multiple preset latent image lines located in the light-receiving sub-regions.

In an embodiment, as shown in FIG. 14, a light-receiving sub-region includes multiple rows (the axial direction of a photosensitive drum) of pixel points. Each row of pixel points may expose the photosensitive drum. Thus, multiple preset latent image lines may be disposed at the same time. When different preset latent image lines are located at different positions on the photosensitive drum during imaging, multiple rows of the photosensitive drum of a printer may be sensitive to light at the same time, and multiple pixel points may be sensitive to light at the same time. Compared with the pixel scanning of ordinary laser printers, the photosensitive speed is extremely high. Thus, the printing speed can be greatly improved.

In an embodiment, the imaging method also includes using the imaging device to print a test page. The test page includes multiple preset scanning test points. The missing row and repeated row on the test page are analyzed according to the scanning test points and print points actually printed on the test page. A scanning point is determined according to the missing row and the repeated row.

In the preceding imaging method, a row of pixels on the preset latent image line are not sensitive to light at the same time. The preset latent image line is completely imaged only after completely passing through the light-receiving sub-region. In the imaging process, since splicing regions are spliced, when the photosensitive drum is rotated to different positions, the imaging region in which the preset latent image line is located may be restarted, and the pixel arrangement directions are inconsistent. Thus, this embodiment may perform correction. A test page is printed, so that the repeated row and the missing row may be scanned and analyzed. In this manner, the corresponding scanning point is selected. That is, a light-emitting unit that is lit is selected to ensure that the repeated row and the missing row do not occur, and the misalignment distance of the scanning point in the paper feeding direction is determined. The scanning point is determined in the following manners according to the missing row and the repeated row: If an aligned pixel point exists in the multiple scanning test points, the aligned pixel point is used as the scanning point; and if no aligned pixel point exists in the multiple scanning test points, grayscale transformation is performed on pixel points adjacent to one of the multiple scanning test points so as to make a point of highest brightness after superposition of grayscale of the pixel points adjacent to the one scanning test point be located at the one scanning test point.

Figure 15:
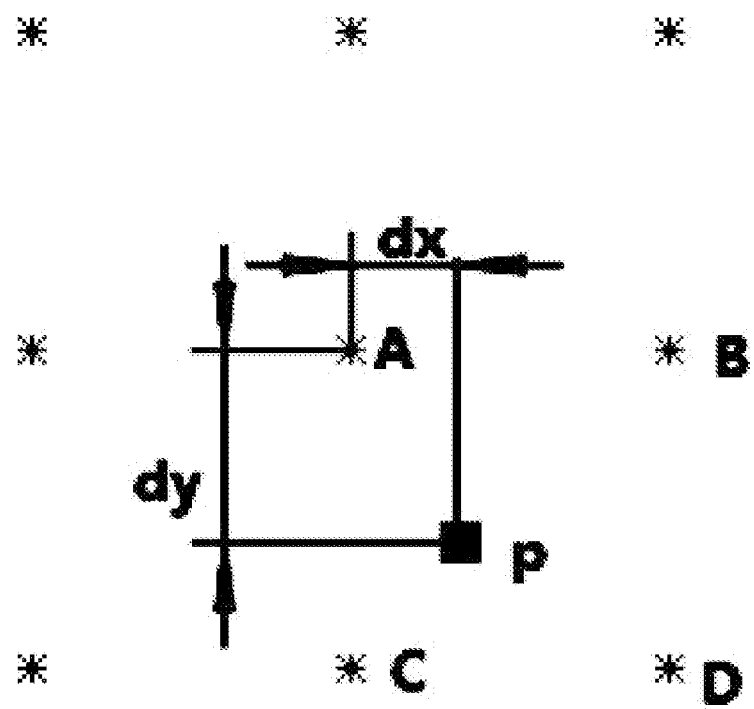
FIG. 15 is a diagram of a test page according to an embodiment of the present disclosure.

FIG. 15 is a diagram of a test page according to an embodiment of the present disclosure. As shown in FIG. 15, in this embodiment, the test page includes preset scanning test points P. If a print result of printing the scanning test points P is a print point A, a print point B, a print point C, and a print point D, there is a deviation between the two. Pixel points around the scanning test point may be transformed according to a distance grayscale, so that the point of highest brightness after superposition of grayscale is located at a scanning test point P, thereby making a difference to a print file to implement accurate printing.

As can be seen from the preceding analysis, the latent image pixel of the photosensitive drum is not in a one-to-one relationship with the pixel on the display chip, and there is a one-to-many relationship. Even if a bad pixel exists on the display chip, the latent image imaging quality is not affected.

When a display system is fixed, the position relationship and the relative brightness between display pixels are determined. A display control algorithm may calculate the timing of the lighting of the display chip according to the relative position relationship and the relative brightness between various pixels, and the rotational speed of the axial direction of the photosensitive drum, thereby implementing the correct latent image on the photosensitive drum.

It is to be understood that various forms of the preceding flows may be used with steps reordered, added, or removed. For example, the steps described in the present disclosure may be executed in parallel, in sequence or in a different order as long as the desired results of the technical solutions provided in the present disclosure are achieved.

In the imaging device used in the embodiments of the present disclosure, the beam deflection system is configured to image images corresponding to all the light-emitting regions on the display chip to the photosensitive drum. Thus, high-resolution printing may be implemented by using a low-resolution pixel array, and the utilization rate of the light-emitting region on the display chip is greatly improved, thereby increasing the width of the latent image on the photosensitive drum.

What is claimed is:

1. An imaging device, comprising:
M rotatable photosensitive drums, wherein each photosensitive drum of the M rotatable photosensitive drums is configured to form an electronic latent image in a light-receiving region of each photosensitive drum through exposing the light-receiving region; wherein M is greater than or equal to 1, and the light-receiving region comprises a plurality of light-receiving sub-regions arranged in an axial direction of each photosensitive drum;
at least one display chip, wherein each of the at least one display chip comprises at least two light-emitting regions arranged in a first direction, light-emitting regions of the at least one display chip have a one-to-one correspondence with light-receiving sub-regions of the M rotatable photosensitive drums, and each light-emitting region is provided with a plurality of light-emitting units;
at least one projection lens in one-to-one correspondence with the at least one display chip, wherein each of the at least one projection lens is configured to form an image for a corresponding display chip of the at least one display chip; and
at least one beam deflection system in one-to-one correspondence with the at least one display chip, wherein each of the at least one beam deflection system is configured to deflect an image, which is formed by light from one light-emitting region in a display chip of the at least one display chip through a corresponding projection lens of the at least one projection lens, to a light-receiving sub-region corresponding to the one light-emitting region.

2. The imaging device according to claim 1, wherein the at least one beam deflection system comprises M beam deflection assemblies corresponding to the M photosensitive drums in a one-to-one manner, each of the M beam deflection assemblies comprises at least two reflective mirrors, and each of the at least two reflective mirrors corresponds to one of the light-emitting regions of the at least one display chip; and each reflective mirror is configured to deflect the image, which is formed by light from the one light-emitting region in the display chip of the at least one display chip through the corresponding projection lens of the at least one projection lens, to the light-receiving sub-region corresponding to the one light-emitting region.

3. The imaging device according to claim 2, wherein each reflective mirror is configured to deflect the image, which is formed by light from the one light-emitting region in the display chip of the at least one display chip through the corresponding projection lens of the at least one projection lens, to the light-receiving sub-region corresponding to the one light-emitting region and a portion of another light-receiving sub-region adjacent to the light-receiving sub-region corresponding to the one light-emitting region.

4. The imaging device according to claim 2, wherein the imaging device comprises at least two display chips and at least two beam deflection systems; and each of the at least two beam deflection systems is configured to deflect an image, which is formed by light from one light-emitting region in a display chip of the at least two display chips through a corresponding projection lens of the at least one projection lens, to a preset region, and the preset region comprises a plurality of adjacent light-receiving sub-regions.

5. The imaging device according to claim 4, wherein adjacent preset regions partially overlap.

6. The imaging device according to claim 2, wherein the imaging device comprises one photosensitive drum; or
the imaging device comprises four photosensitive drums, and the four photosensitive drums are configured to adsorb toner of different colors.

7. The imaging device according to claim 1, wherein the imaging device comprises one display chip and four photosensitive drums, and the four photosensitive drums are configured to adsorb toner of different colors and are arranged in a second direction from a first photosensitive drum of the four photosensitive drums to a fourth photosensitive drum of the four photosensitive drums in sequence; projections of the four photosensitive drums coincide in the second direction, and an axial direction of each of the four photosensitive drums is perpendicular to the second direction;

wherein the one display chip comprises 4*N light-emitting regions, wherein N is an even number greater than 2; and the one display chip corresponds to one beam deflection system;

wherein the one beam deflection system comprises:

a primary image splitting mirror, wherein in the second direction, a projection of the primary image splitting mirror does not overlap projections of the four photosensitive drums; in a third direction, a projection of the primary image splitting mirror is located between a second photosensitive drum of the four photosensitive drums and a third photosensitive drum of the four photosensitive drums; the third direction is perpendicular to both an axial direction of the four photosensitive drums and the second direction; and the primary image splitting mirror is configured to emit part of emitted light of each of the 4*N light-emitting regions of the one display chip in the second direction and emit remaining part of the emitted light in a fourth direction, and the fourth direction is opposite to the second direction;

a first secondary image splitting mirror, wherein in the third direction, a projection of the first secondary image splitting mirror is located between the third photosensitive drum and the fourth photosensitive drum; and the first secondary image splitting mirror is configured to emit, in a fifth direction, part of light which is emitted by the primary image splitting mirror in the second direction and emit, in a sixth direction, remaining part of the light which is emitted by the primary image splitting mirror in the second direction, wherein the sixth direction is opposite to the fifth direction, and the sixth direction and the fifth direction are each parallel to the axial direction of the four photosensitive drums; and a second secondary image splitting mirror, wherein in the third direction, a projection of the second secondary image splitting mirror is located between the first photosensitive drum and the second photosensitive drum, and the second secondary image splitting mirror is configured to emit, in the fifth direction, part of light which is emitted by the primary image splitting mirror in the fourth direction and emit, in the sixth direction, remaining part of the light which is emitted by the primary image splitting mirror in the fourth direction;

wherein each emitted optical path of the first secondary image splitting mirror and the second secondary image splitting mirror is provided with at least two region image splitting mirrors; each of the at least two region image splitting mirrors is configured to reflect part of light corresponding to one of the 4*N light-emitting regions of the one display chip in the fourth direction and reflect remaining part of the light corresponding to the one light-emitting region in the second direction; and different region image splitting mirrors of the at least two region image splitting mirrors correspond to different light-emitting regions of the 4*N light-emitting regions of the one display chip; and a reflective mirror is disposed on each emitted optical path of each of the at least two region image splitting mirrors, and each reflective mirror is configured to reflect received light to a corresponding light-receiving sub-region of light-receiving sub-regions of the four photosensitive drums.

8. The imaging device according to claim 7, wherein the one display chip comprises two display sub-regions divided by a center line, and each of the two display sub-regions comprises a plurality of light-emitting regions of the 4*N light-emitting regions;

in the first photosensitive drum and the second photosensitive drum, a light-emitting region of the 4*N light-emitting regions is located between two spaced light-emitting regions corresponding to two light-receiving sub-regions, respectively, which are symmetrical about a center line between the first photosensitive drum and the second photosensitive drum;

in the third photosensitive drum and the fourth photosensitive drum, another light-emitting region of the 4*N light-emitting regions is located between two spaced light-emitting regions corresponding to two light-receiving sub-regions, respectively, which are symmetrical about a center line between the third photosensitive drum and the fourth photosensitive drum; and in a plurality of light-receiving sub-regions corresponding to a same photosensitive drum of the four photosensitive drums, two light-emitting regions, which correspond to two adjacent light-receiving sub-regions of the plurality of light-receiving sub-regions, respectively, are located in different display sub-regions of the two display sub-regions.

9. The imaging device according to claim 1, wherein the at least one display chip is a micro light-emitting diode (microLED) chip.

10. An imaging method of an imaging device, wherein the imaging device is the imaging device according to claim 1; light-emitting units of all display chips are arranged in a matrix; all light-emitting regions are imaged in light-receiving sub-regions as a plurality of pixel points arranged in a matrix along a row direction and a column direction, and an included angle between the row direction and an axial direction of each of all photosensitive drums and an included angle between the column direction and the axial direction of each of all the photosensitive drums are each not equal to 90 degrees; and the imaging method comprises:

rotating a preset latent image line of each of all the photosensitive drums to a position of a corresponding imaging pixel row in all light-receiving regions, wherein the preset latent image line is parallel to the axial direction of each photosensitive drum, the corresponding imaging pixel row is parallel to the axial direction of each photosensitive drum, each imaging pixel row in all the light-receiving regions comprises a plurality of imaging pixels, and the plurality of imaging pixels are pixel points of the plurality of pixel points or superposition of at least two pixel points around a pixel point of the pixel points of the plurality of pixel points;

turning on all the display chips to use the corresponding imaging pixel row to photosensitize a partial region of the preset latent image line; and rotating each photosensitive drum to move the preset latent image line, and, in a case where the preset latent image line moves to a next imaging pixel row, turning on all the display chips.

11. The imaging method according to claim 10, further comprising: simultaneously imaging a plurality of preset latent image lines located in the light-receiving sub-regions.

12. The imaging method according to claim 10, further comprising: using the imaging device to print a test page, wherein the test page comprises a plurality of preset scanning test points;

analyzing a missing row and a repeated row on the test page according to the plurality of scanning test points and print points actually printed on the test page; and determining a scanning point according to the missing row and the repeated row.

13. The imaging method according to claim 12, wherein determining the scanning point according to the missing row and the repeated row comprises:

based on a determination result in which an aligned pixel point exists in the plurality of scanning test points, using the aligned pixel point as the scanning point; and based on a determination result in which no aligned pixel point exists in the plurality of scanning test points, performing grayscale transformation on pixel points adjacent to one of the plurality of scanning test points so as to make a point of highest brightness after superposition of greyscale of the pixel points adjacent to the one scanning test point be located at the one scanning test point.

14. The imaging device according to claim 4, wherein the imaging device comprises one photosensitive drum; or the imaging device comprises four photosensitive drums, and the four photosensitive drums are configured to adsorb toner of different colors.

15. A printer, comprising a toner cartridge and an imaging device:

wherein the imagine device, comprising:

M rotatable photosensitive drums, wherein each photosensitive drum of the M rotatable photosensitive drums is configured to form an electronic latent image in a light-receiving region of each photosensitive drum through exposing the light-receiving region; wherein M is greater than or equal to 1, and the light-receiving region comprises a plurality of light-receiving sub-regions arranged in an axial direction of each photosensitive drum;

at least one display chip, wherein each of the at least one display chip comprises at least two light-emitting regions arranged in a first direction, light-emitting regions of the at least one display chip have a one-to-one correspondence with light-receiving sub-regions of the M rotatable photosensitive drums, and each light-emitting region is provided with a plurality of light-emitting units;

at least one projection lens in one-to-one correspondence with the at least one display chip, wherein each of the at least one projection lens is configured to form an image for a corresponding display chip of the at least one display chip; and at least one beam deflection system in one-to-one correspondence with the at least one display chip, wherein each of the at least one beam deflection system is configured to deflect an image, which is formed by light from one light-emitting region in a display chip of the at least one display chip through a corresponding projection lens of the at least one projection lens, to a light-receiving sub-region corresponding to the one light-emitting region.

16. The printer according to claim 15, wherein the at least one beam deflection system comprises M beam deflection assemblies corresponding to the M photosensitive drums in a one-to-one manner, each of the M beam deflection assemblies comprises at least two reflective mirrors, and each of the at least two reflective mirrors corresponds to one of the light-emitting regions of the at least one display chip; and each reflective mirror is configured to deflect the image, which is formed by light from the one light-emitting region in the display chip of the at least one display chip through the corresponding projection lens of the at least one projection lens, to the light-receiving sub-region corresponding to the one light-emitting region.

17. The printer according to claim 16, wherein each reflective mirror is configured to deflect the image, which is formed by light from the one light-emitting region in the display chip of the at least one display chip through the corresponding projection lens of the at least one projection lens, to the light-receiving sub-region corresponding to the one light-emitting region and a portion of another light-receiving sub-region adjacent to the light-receiving sub-region corresponding to the one light-emitting region.

18. The printer according to claim 16, wherein the imaging device comprises at least two display chips and at least two beam deflection systems; and
- each of the at least two beam deflection systems is configured to deflect an image, which is formed by light from one light-emitting region in a display chip of the at least two display chips through a corresponding projection lens of the at least one projection lens, to a preset region, and the preset region comprises a plurality of adjacent light-receiving sub-regions.

19. The printer according to claim 18, wherein adjacent preset regions partially overlap.

20. The printer according to claim 16, wherein the imaging device comprises one photosensitive drum; or the imaging device comprises four photosensitive drums, and the four photosensitive drums are configured to adsorb toner of different colors.

\* \* \* \* \*